Oct. 13, 1942.　　　　J. S. MANTON　　　　2,298,494
SPRING FORK BICYCLE
Filed March 14, 1940　　　　2 Sheets-Sheet 1

Inventor:
James S. Manton
By Brown, Jackson, Boettcher, Dienner
Attys.

Oct. 13, 1942.    J. S. MANTON    2,298,494
SPRING FORK BICYCLE
Filed March 14, 1940    2 Sheets-Sheet 2
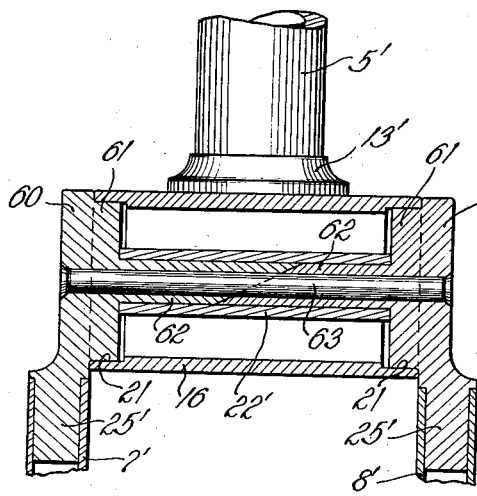
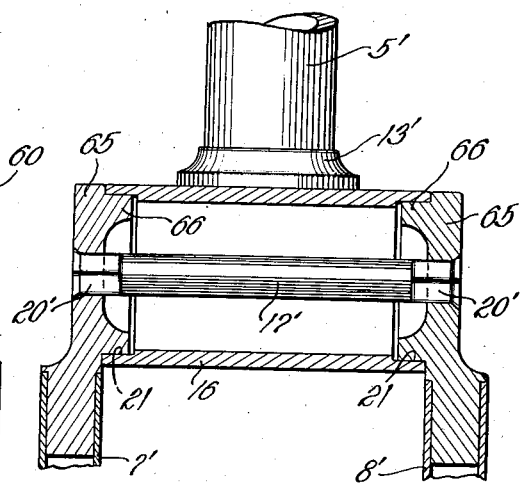
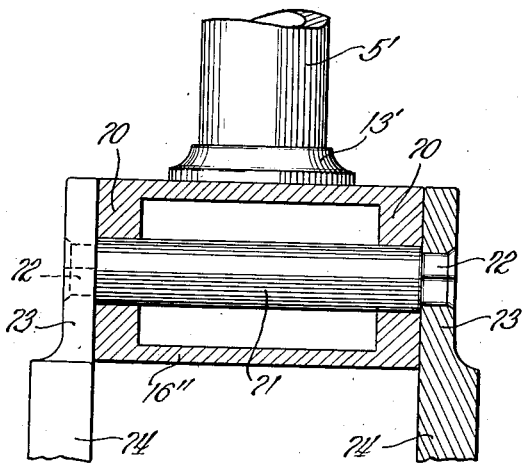
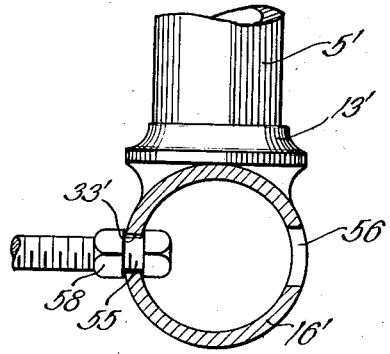
Inventor:
James S. Manton
By Brown Jackson Boettcher Dienner
Attys.

Patented Oct. 13, 1942

2,298,494

UNITED STATES PATENT OFFICE 2,298,494

SPRING FORK BICYCLE

James S. Manton, Oak Park, Ill.

Application March 14, 1940, Serial No. 323,850

2 Claims. (Cl. 280—276)

The present invention relates to an improvement in spring fork bicycles and is more particularly concerned with an improved fork member for rotatably supporting a wheel and in addition having means for absorbing and cushioning shocks caused when the bicycle is traveling over rough surfaces or when the front wheel strikes an obstruction, without transmitting the shock to the frame structure in which the fork member is mounted. In its broader aspects my invention is applicable for use with any form of mechanism employing a fork mounting of a wheel, for example, motorcycles, tricycles and the like.

My invention is directed to the provision of an improved and relatively simple fork member for rotatably supporting a wheel. More specifically, my invention is directed to a spring fork member having a pair of fork arms or blades pivotally mounted about a horizontal axis and having a pair of truss rods or bars for absorbing shock, anchored adjacent opposite ends of the fork member. It is also an object to provide, in a structure of the character noted, means extending between the fork member and the truss rods to aid additionally in absorbing shock. Other objects and advantages will appear from the following detached description.

In the drawings:

Figure 4 is a vertical sectional view of a modified form of fork construction suitable for use in the present invention;

Figure 5 is a vertical sectional view of another modified form of fork construction;

Figure 6 is a vertical sectional view of a still further modified form of fork construction; and Figure 7 is a detail substantially vertical sectional view of a modified construction of a part of the means for mounting the shock absorbing spring members of the present invention.

Figure 1:
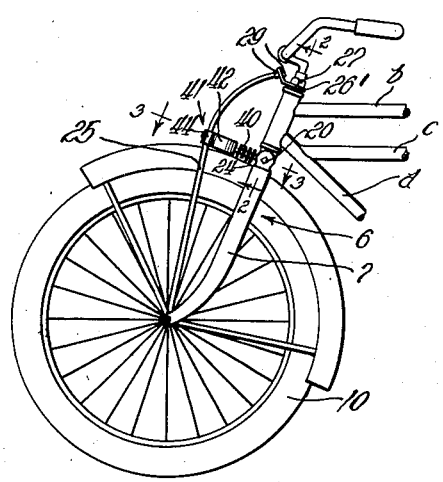
Figure 1 is a side elevational view of a front portion of a bicycle in which the present invention has been incorporated.
Figure 2:
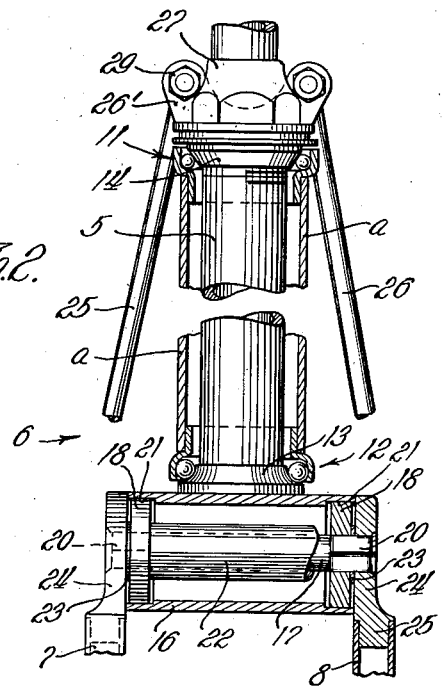
Figure 2 is a substantially vertical sectional view, taken on the line 2—2 of Figure 1, certain parts being shown in elevation.

Referring now to Figures 1 and 2 of the drawings, I have disclosed the spring fork of my invention, by way of illustration, as applied to a bicycle B of known construction having a frame comprising a tubular head $a$ and an upper horizontal bar $b$, a lower horizontal bar $c$ and a bar $d$, the bars $b$ and $d$ being rigidly secured to the head $a$ in a known manner as by welding. Head $a$ receives tubular fork stem 5 of the fork member, indicated by the reference numeral 6, having a pair of fork arms 7 and 8 in which, at their lower ends, an axle is supported for rotatably mounting the front wheel 10 of the bicycle. Only the front portion of the bicycle has been shown in the drawings, since the present invention is particularly concerned with a spring fork for the mounting of the front wheel, the remainder of the bicycle being constructed in a manner known in the art.

The fork stem 5 is rotatably mounted in the head $a$ in any suitable manner, as by providing a pair of ball bearing races 11 and 12 at the upper and lower open ends, respectively, within the head $a$ of the bicycle frame. Preferably the inner cone 13 of the lower ball bearing race 12 is formed integrally with the stem 5 and the inner cone 14 of the upper ball bearing race 11 may be threaded upon the stem 5, as is well known in the art. A tubular fork crown 16 is suitably secured, as by welding, to the lower portion of fork stem 5 adjacent the inner race 13.

The fork blades 7 and 8 are pivotally mounted on a horizontal axis by means of a shaft 17 which extends through the fork crown 16 and is rotatably supported therein by means of bearing members 18 which are fixed to the square ends 20 of the shaft 17. The bearings 18 seat in recessed bearing portions 21 adjacent the opposite open ends of the fork crown 16. A spacer sleeve 22 is mounted over an intermediate circular portion of the shaft 17 and serves to maintain the bearings 18 in proper spaced relation within the crown 16. Washers 23 are carried by the shaft ends and a pair of closure members 24 having suitable square openings are fitted over the square shaft ends 20 and are rigidly secured thereto by spreading the ends of the shaft 17. The closure members are provided with depending lug portions 25 to which the tubular fork arms 7 and 8 are rigidly secured by press fitting or welding or other suitable manner. It will be apparent that, if desired, fork members 7 and 8 could be made solid and the crown closure members 24 which are secured to the shaft 17 formed integral therewith.

The axle for rotatably supporting the front wheel 10 of the bicycle is suitably mounted in the ends of the fork arms 7 and 8 in a known manner. A pair of bowed resilient truss rods 25 and 26, preferably made of spring metal, are secured to opposite ends of the axle adjacent the lower portion of fork arms 7 and 8 and at their opposite ends project through a retaining plate member 26' which may be secured to the threaded end of the fork member 5 as by means of the nut 27. The ends of the truss rods are secured to the plate member 26 as by nuts 29. Broadly, it is the purpose of this invention to employ the truss rods, in addition to their ornamental effect, to provide means for absorbing shock caused by the front wheel 10 in traveling over rough surfaces or by the wheel striking an obstruction along its travel, to prevent the resultant shocks from being transmitted to the frame of the bicycle. These truss rods cushion the shock and lessen the danger of the shock from fracturing the frame and greatly increase the riding comfort of the bicycle. In the construction so far disclosed it will be apparent that if the vehicle is traveling in a forward direction and a curb or other obstruction is struck by the wheel, the resulting force will tend to rotate the pivoted fork arms 7 and 8 together in a counterclockwise direction as viewed in Figure 1, tending to force the bowed truss rods inwardly. The truss rods being anchored to opposite ends of the fork member will be placed under tension and will absorb and cushion the shock. If the wheel strikes an obstruction tending to rotate the fork arms 7 and 8 in a clockwise direction, the truss rods will be forced outwardly and placing them under compression whereby they will absorb and cushion the shock. It will be apparent, from the above noted functions of the truss rods, that they will also effectively absorb and cushion shocks caused by traveling over uneven or rough surfaces.

Figure 3:
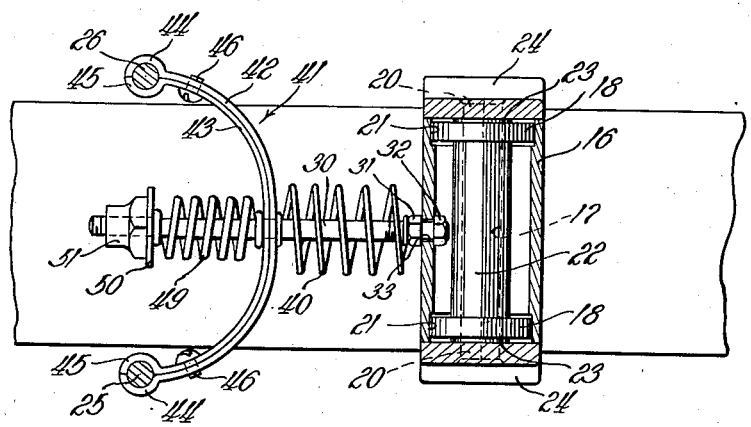
Figure 3 is a substantially horizontal sectional view taken on the line 3—3 of Figure 1, certain parts being shown in elevation.

Referring now to Figures 1 and 3, I have shown additional means, which preferably is disposed between the fork member and the truss rods for further cushioning and absorbing shock which would otherwise be transmitted to the bicycle. This means comprises a stud 30 which is preferably fixed to the fork crown by means of a pair of nuts 31 and 32. In the embodiment shown in Figure 3, the stud 30 is threaded at its end adjacent the crown housing and upon which the nut 31 is first threaded. The stud is then mounted from the outside through an opening 33 made substantially mid-way of the ends of the fork crown housing 16 and the nut 32 is threaded upon the end of the stud within the crown housing before assembly of the fork blades 7 and 8 and associated parts, to securely fasten the stud to the crown.

A compression spring 40 is disposed about the end of the stud 30 adjacent the crown and seats against the nut 31 at one end and at its opposite end against a two part substantially U-shaped bracket or supporting member 41. The bracket 41 is formed of a pair of metal straps 42 and 43 which have semicircular portions 44 and 45, respectively, at each end, for encircling the truss rods 25 and 26. The strap members are rigidly secured to the truss rods and to each other by means of bolts 46 which are threaded through the straps 42 and 43 closely adjacent the semicircular portions 44 and 45. A second compression spring 49 is disposed about the stud 30 and seats against the strap 43 at one end and at its other end abuts a washer 50 which is fixed to the shaft by means of a nut 51 threaded upon the end of stud 30.

The compression spring 49 is preferably stronger than the spring 40 so that the truss rods 25 and 26 normally are under slight tension. The wheel 10 in traveling over rough or uneven surfaces is more frequently subject to shocks tending to rotate the fork arms 7 and 8 in a clockwise direction and since these shocks are relatively light they will be completely absorbed by slight compression of the spring 49. Heavier shocks tending to rotate the fork arms in the direction indicated will be absorbed by compression of the spring 49, together with the spring action of the truss rods which will be placed under compression as has already been noted.

Uneven surfaces or bumps encountered by the wheel 10 tending to rotate the fork arms 7 and 8 in a counterclockwise direction will be absorbed by the spring 40 together with the truss rods the function of which have already been set forth.

It will be apparent that means other than the springs 40 and 49 may be employed for the purpose noted and, broadly, I contemplate the provision of any means which will function to oppose deformation of the truss rods to additionally aid in absorbing shocks.

If desired a headed bolt 55, as shown in Figure 7, may be employed in lieu of the stud 30 for mounting the associated parts of the spring shock absorbing means. In the latter figure, an opening 56 of a diameter greater than the diameter of the head of bolt 55 is made in the crown 16' diametrically opposite the opening 33'. The latter opening 33' is of a diameter smaller than the diameter of the head of the bolt and provides a seat for the bolt within the crown housing. The bolt 55 is threaded throughout its entire length and is rigidly secured to the fork crown by means of a nut 58 which is threaded along the bolt to a position adjacent the crown. It will be understood, however, the spring members could be suitably mounted between the fork member and truss rods in various other manners and the forms shown are illustrative only.

Referring now to Figures 4, 5 and 6, I have shown various forms of modified fork constructions suitable for use in the present invention.

In Figure 4 crown enclosure members 60 are provided with bearing portions 61 formed integral therewith. The crown enclosure members 60 are provided, as in the previous modification, with depending lug portions 25' to which tubular fork arms 7' and 8', respectively, are secured. Extending inwardly from the bearing portions of the crown enclosure members are shank members 62 the end portions of which are inclined with respect to each other. These inclined surfaces seat upon each other and are connected for conjoint pivotal movement by means of a round shaft 63, the opposite ends of which are spread to hold the closure members 60 in assembled relation with respect to the crown. If desired a spacer sleeve 22' may be employed for further confining the shank portions 62 of the closure members and for properly spacing the closure members with respect to each other. It will be obvious that the inwardly extending shank portions of the closure members 60 may be otherwise formed in order to insure conjoint pivotal movement of the fork arms 7' and 8'.

In Figure 5 the fork arms 7' and 8' are pivotally connected together through the crown housing by means of closure members 65 having integral bearing portions 66. As in the modification of Figure 2, the shank 17' is formed with square terminal portions 20' which are spread at their ends to secure the crown closure members thereto, in order that the fork arms 7' and 8' will pivot together.

If desired the bearing members for rotatably supporting the fork arms may be formed integral with the crown housing 16", as at 70 in Figure 6. Likewise in this construction a shaft 71 having square ends 72 is employed for securing crown closure members 73, which are connected to the fork arms for conjoint pivotal movement. As shown in this figure the fork arms 74 may be made of solid stock and integral with the crown closure members 73.

It will be understood, by those skilled in the art, that various other changes in construction and arrangement of the parts of my invention may be resorted to without departing from the field and scope of the same, and I intend to include all such variations, as fall within the scope of the appended claims, in this application in which the preferred forms only of my invention are disclosed.

I claim:

1. In a bicycle, a frame having a head, a fork structure comprising a stem rotatably mounted through said head provided at its lower end with a fork crown rigid therewith, and a pair of fork blades carried by said crown connected thereto at their upper ends for movement about a horizontal axis, a wheel rotatably mounted in the lower ends of said blades, continuous resilient one piece truss rods fixedly secured at their lower ends to said fork blades adjacent the lower ends of the latter, said rods extending upward in front of said fork blades with their upper portions curved rearward and fixedly secured at their upper ends to said stem above said head, said rods serving as spring members resisting movement of said blades about said horizontal axis, and yielding means connecting said rods intermediate their ends to said crown of said fork structure resisting flexing of said rods while permitting flexing thereof responsive to resistance to travel of said wheel by obstacles encountered thereby.

2. In a bicycle, a frame having a head, a fork structure comprising a stem rotatably mounted through said head provided at its lower end with a fork crown rigid therewith, and a pair of fork blades carried by said crown connected thereto and secured together at their upper ends for movement together as a unit about a horizontal axis, and continuous one piece resilient truss rods fixedly secured at their lower ends to said fork blades adjacent the lower ends of the latter, said rods extending upward in front of said fork blades with their upper portions curved rearward and fixedly secured at their upper ends to said stem above said head, said rods serving as spring members resisting movement of said blades about said horizontal axis.

JAMES S. MANTON.